May 7, 1968   R. E. WEAR   3,381,552

BORING HOLES

Filed Dec. 1, 1965

Inventor
Richard Earle Wear
By
Cushman, Darby & Cushman
Attorneys

1

3,381,552
BORING HOLES
Richard Eric Wear, Biggin Hill, Kent, England, assignor to Secretary of State for Defence in Her Britannic Majesty's Government of the United Kingdom of Great Britain and Northern Ireland, London, England
Filed Dec. 1, 1965, Ser. No. 511,302
4 Claims. (Cl. 77—56)

ABSTRACT OF THE DISCLOSURE

Disclosed in this application is a boring tool having a cutting head provided in its exterior surface with two axially spaced sets of burnishing inserts. The cutting head is connected to a boring bar by a flexible coupler.

The invention relates to boring tools and is particularly concerned with the machining of deep bores. With a conventional boring bar only comparatively short lengths of bores can be accurately machined since, when the ratio of bore length to bore diameter exceeds say 16:1, the boring bar is not sufficiently rigid to maintain accurate alignment at its cutting tip.

It is an object of the invention to provide a boring tool capable of machining accurately aligned bores with bore length to bore diameter ratios greater than heretofore, for example of a ratio of 50:1 or more.

According to the invention a boring tool capable of machining deep bores consists of a cutting head flexibly connected to a boring bar so that the cutting head guides itself along the bore it is forming, the boring bar serving to transmit the axial thrust and the torque required for cutting the bore. Such a cutting head may be provided with two sets of burnishing inserts, one set adjacent the cutting tip and the other set spaced axially a distance away towards the boring bar. Included in the burnishing inserts adjacent the cutting tip may be a burnishing insert movable radially by fluid pressure to ensure that each burnishing insert at the cutting tip is in contact with the bore to provide accurate location of the cutting head in the bore.

The invention will now be described, by way of example only, with reference to the accompanying drawings in which.

Figure 1:
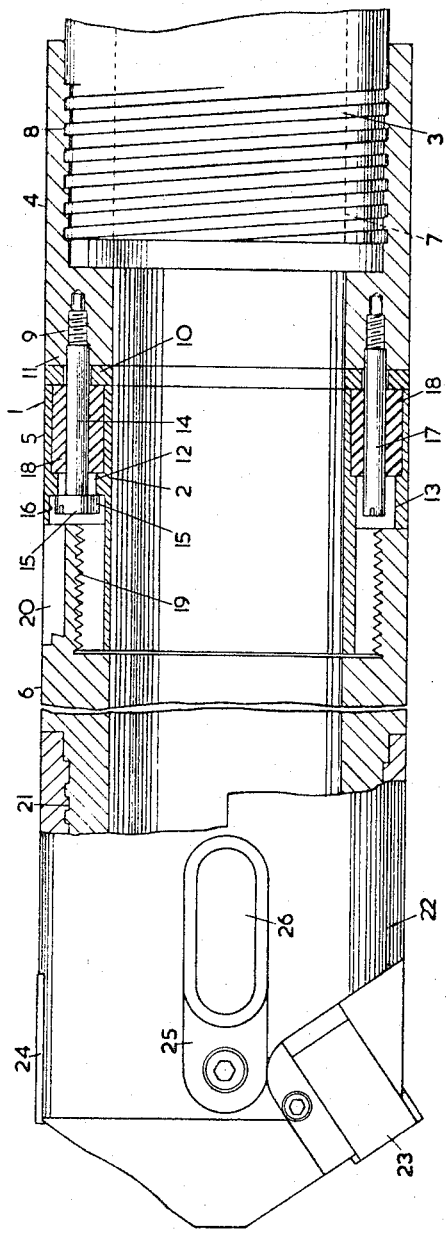
FIGURE 1 is a partly sectional view of one form of the invention.

FIGURE 1 shows one form of boring tool consisting of a flexible connector, generally indicated at 1, provided with an axial bore 2 which is screwed onto the end of a boring bar 3 mounted on any suitable machine. This flexible connector 1 is formed as three members, a rear member 4 screwed onto the boring bar 3, an intermediate member 5 flexibly connected to the rear member 4, and a front member 6 screwed onto the intermediate member 5. All three members 4, 5, 6 have formed therein a section of the bore 2 of the flexible connector 1 whose axis is co-axial with a bore 7 in the boring bar 3. The section of the bore 2 in the rear member 4 has an enlarged portion 8 which is internally screw-threaded enabling it to be screwed onto a screw-threaded portion at the leading end of the boring bar 3. The face of the rear member 4 remote from the boring bar has twelve equi-spaced screw threaded holes 9 arranged parallel to the axis of the rear member 4. Located between the rear member 4 and the intermediate member 5 is a resilient plastics washer, such as a rubber washer 10, having apertures 11 formed therein in register with the screw-threaded holes 9 in the rear member 4. The intermediate member 5 is formed of two integral cylindrical coaxial portions; one of which has formed therein six-bolt holes 12 and six stud holes 13 arranged alternately on a common pitch circle and in register with the screw-threaded holes 9 in the rear member. The bolt holes 12 are adapted to receive six bolts 14 which have their heads 15 received in counter bores 16 and which pass through the apertures 11 in the rubber washer 10 to screw into screw-threaded holes 9 in the rear member 4 thereby holding the rear member 4 and the intermediate member 5 together. Six studs 17 are screwed into the screw-threaded holes 9 in the rear member 4 and project through the rubber washer 10 into the stud holes 13 in the intermediate member 5. Each bolt hole 12 and stud hole 13 is recessed for a portion of its length to receive resilient plastics bushes such as rubber bushes 18 which abut against the rubber washer 10 and surround the bolts 14 and the studs 17 for part of their length. The second portion 19 of the intermediate member is of reduced diameter and is externally screw-threaded throughout its length, said second portion of the intermediate member 5 being adapted to engage an internally screw-threaded portion of the section of the bore in the front member 6. Formed in the outer surface of the front member 6 adjacent the intermediate member 5 are three equi-spaced recesses which receive burnishing inserts 20. The end 21 of the front member 6 remote from the intermediate member 5 is of reduced diameter and is externally screw-threaded to enable a cutting head 22 to be screwed thereon.

One such cutting head 22 is of cylindrical shape and carries a cutting tip 23 which may be adjustable by any known means such as a wedge member (not shown) sliding in a bore (not shown) located at an angle to the cutting head axis. Machine cutting oil and coolant is fed to the cutting tip 23 through the boring bar 3, the bore 2 in the flexible connector 1, and through channels (not shown) in the cutting head 22. Located in recesses on the outer surface of the cutting head 22 and just axially behind the cutting tip 23 are four burnishing inserts one of which is shown at 24; one positioned diametrically opposite the cutting tip 23 and the remaining three equi-spaced between them and disposed on one side of the diametral plane through the cutting tip 23. Secured in a recess located on the other side of the diametral plane at 90° to the cutting tip is a lignum vitae, or other suitable soft material, burnishing insert 25. Immediately behind this is a floating burnishing insert 26 arranged to be moved radially outwards by the pressure of the machine cutting oil so that when the cutting head 22 is in its operative position in a bore in a workpiece it is held steady in the said bore by the burnishing inserts 24, 26 pressing against the interior wall of the bore.

In operation to machine a bore in a workpiece the cutting oil is switched on to half pressure or flow and the cutting head 22 and flexible connector 1 are enclosed in a guiding tube (not shown). This guiding tube guides the cutting head 22 as it enters a bore and provides an accurate location of the mouth of the bore. As the cutting head 22 is traversed along the bore it is cutting, the floating burnishing insert 26 enters the bore; the full pressure or flow of the cutting oil is then allowed to pass to the cutting head 22 and in doing so the floating burnishing insert 26 is moved radially outwards into contact with the bore. Further traversing of the cutting head 22 moves the intermediate member 5 into the bore. At this stage the location and alignment of the cutting head 22 in the bore is provided by the burnishing inserts 24, 26 in the cutting head 22 and the inserts 20 in the flexible connector 1 engaging with the bore. For this reason the burnishing inserts 20 in the flexible connector 1 need to be as remote as possible behind the burnishing inserts 24, 25 in the cutting head 22. The rubber washer 10 transmits the axial thrust, the torque is transmitted from the boring bar 3 through the bolts 15 and the studs 17 and the rubber bushes 18 to the cutting head 22.

If desired the material of the rubber washer 10 and rubber bushes 18 may be varied in hardness, or any other suitable oil proof resilient material may be used.

Figure 2:
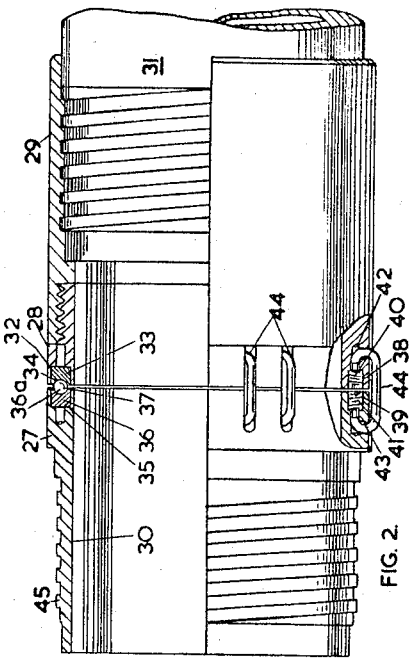
FIGURE 2 is a sectional view of a modified form of the invention, particularly for use with trepanning head.

FIGURE 2 shows an alternative form of flexible connector which comprises three tubular members, i.e. a front member, an intermediate member 28 and a rear member 29, provided with a bore 30 and coaxially connected together. The rear member 29 is screwed at one end to a boring bar 31 of a suitable machine and at its other end to the intermediate member 28. Formed in the intermediate member 28 are eight equi-spaced screw-threaded holes 32 which receive inserts 33 provided with a hemispherical seatings 34. Similarly formed in the front member 27 are eight equi-spaced screw-threaded holes 35 which house eight inserts 36, provided with hemispherical seatings 36a, located in register with the inserts 33, in the intermediate member 28 so that a locating member such as a ball bearing 37 may be held between each pair of inserts 33, 36 to provide accurate positioning between the front and intermediate members 27, 28 respectively. Also formed in the intermediate member 28 are sixteen holes 38, screw threaded for a portion of their depth, which are in register with sixteen similar holes 39 in the front member 27. Plugs 40, 41, are screwed into these screw-threaded holes 38, 39 respectively. Radial slots 42, 43 respectively extend outwardly from the blind ends of the holes 38, 39 to allow the ends of springs 44 to pass therethrough and clamp on the end of the plugs 40, 41 thereby holding the intermediate member 28 and front member 27 together. The front member 27 has a screw-threaded portion 45 onto which a cutting head (not shown) may be screwed.

In operation the springs 44 allow the front member 27 to move relative to the intermediate member 28 whilst spring urging the said front and intermediate members 27, 28 into alignment under the guidance of the ball bearings 37 and the seatings 34, 36a in the inserts 33, 36. When using a trepanning cutting head the bore 30 allows the solid core and swarf produced by such a head to be removed through the said bore 30 and through the bore in the boring bar 31.

It should be understood that whilst a cutting head which includes a floating burnishing insert has been described for use with the flexible connector of this invention a trepanning head or any other suitable cutting head may be used.

What I claim is:

1. In a boring tool the combination of a cutting head and flexible coupling means for connecting the cutting head to a boring bar, said cutting head being provided in its exterior surface with two axially spaced sets of burnishing inserts.

2. A boring tool according to claim 1 wherein the flexible coupling means includes two tubular members resiliently and co-axially connected together, one member being connected to the cutting head and the other member adapted to be connected to a boring bar.

3. A boring tool according to claim 2 which further includes a washer of resilient plastic material interposed between a tubular intermediate member and a tubular rear member, bolts connecting the intermediate and rear members together, studs secured in the rear member and projecting into the intermediate member, bushes of a resilient plastic material held in the intermediate member and which bushes enclose a portion of the length of each bolt and stud to transmit torque between the intermediate and rear member.

4. A boring tool according to claim 2 which further includes locating members which engage both an intermediate and a front member to provide axial alignment thereof, and springs which engage the intermediate and front member to both urge the said intermediate and front member together and into contact with the locating members.

No references cited.

GERALD A. DOST, *Primary Examiner.*